Patented Dec. 8, 1953

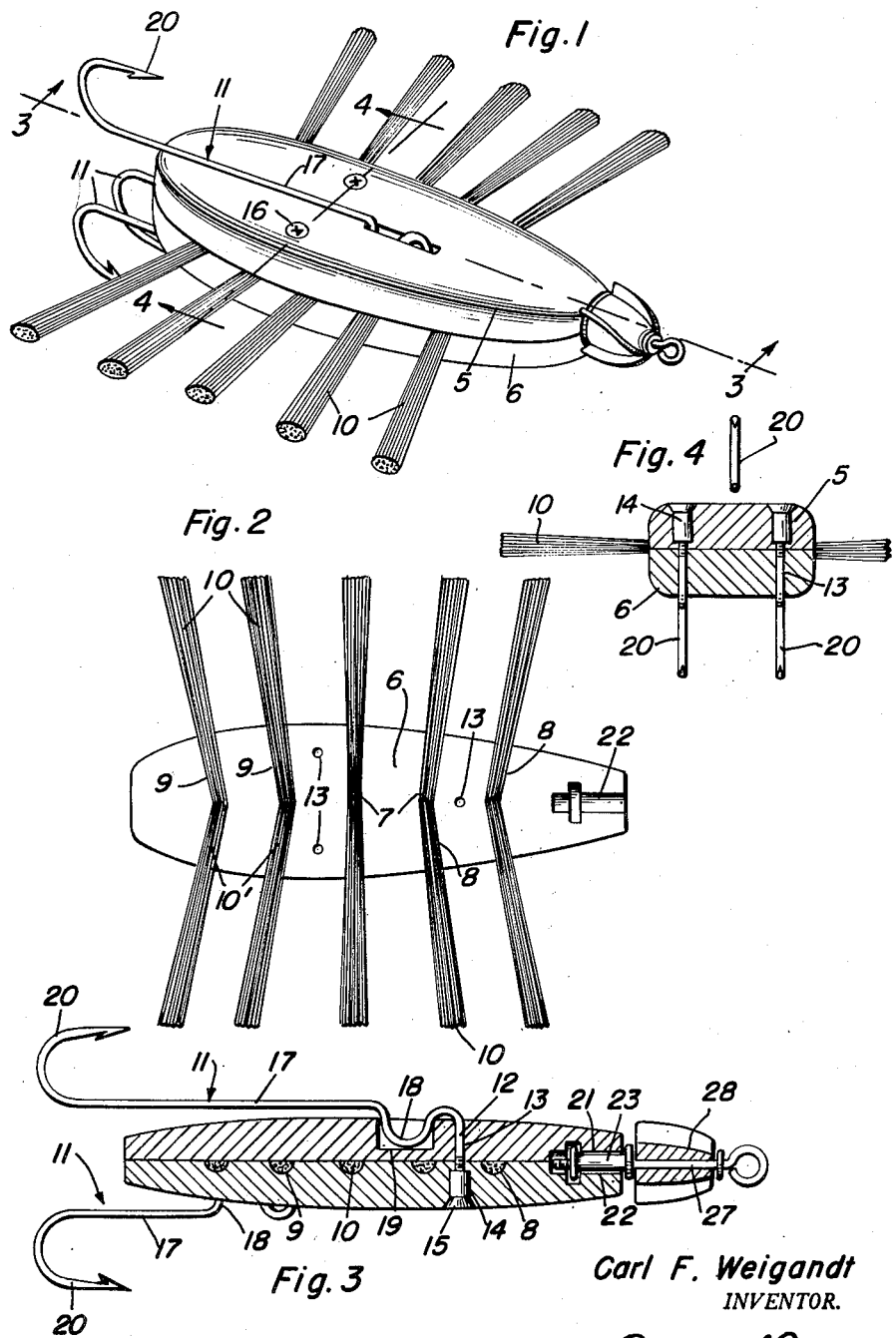

2,661,564

UNITED STATES PATENT OFFICE 2,661,564

FISHING LURE

Carl F. Weigandt, Oakville, Tenn., assignor of forty-nine per cent to Wylie E. Turner, Jr., Piggott, Ark.

Original application September 8, 1949, Serial No. 114,545. Divided and this application May 17, 1951, Serial No. 226,876

1 Claim. (Cl. 43—42.26)

My invention relates to improvements in fish lures simulating a bug and the instant application therefor is a division of my co-pending application for U. S. Letters Patent Serial No. 114,545, filed December 8, 1949, now Patent Number 2,571,980, patented October 16, 1951.

The primary object of my invention is to provide a fish lure including a body composed of easily assembled sections for interchangeably using differently colored or ornamented parts to suit the fancy of the fisherman, or, in accordance with changing conditions.

Another object is to provide novel means for attaching hooks to the body so as to utilize the hooks to hold the sections of the body in assembled relation with the sections of the body holding the differently colored or ornamented parts in place.

Still another object is to provide a fish lure of the type indicated which is simple in construction, and comparatively inexpensive to manufacture.

Other and subordinate objects, within the purview of my invention, together with the precise nature of my improvements will be readily understood when the succeeding description and claim are read with reference to the drawing accompanying and forming part of this specification.

In said drawing:

Figure 1 is a view in perspective of my improved lure;

Figure 2 is a top plan view with the top body section removed, also the spinner and line attaching means, and hooks;

Figure 3 is a view in longitudinal section taken on the line 3—3 of Figure 1, and Figure 4 is a view in transverse section taken on the line 4—4 of Figure 1.

Referring now to the drawing by numerals, the lure of my invention comprises a pair of flat, ovate, body sections 5, 6 positioned in confronting relation to each other and with the outer edges of the sections rounded. The confronting face of section 6 is formed with transverse grooves 7 including front grooves 8 which incline forwardly at each side of the longitudinal axis of the body and rear grooves 9 which incline rearwardly. Groups of bristles, or hairs, 10 are positioned in the grooves to project outwardly at each side of the body and are held in the grooves by the sections 5, 6 when said sections are assembled. The bristles, or hairs, 10 may be centrally bound together as at 10'.

The body sections 5, 6 are held in assembled relation by means of hooks 11 having angular ends 12 inserted in vertical openings 13 in said sections 5, 6, and threading the ends 12 to receive cylindrical nuts 14 having outer ends 15 countersunk in the body. The outer ends 15 of the nuts 14 are formed with screwdriver slots 16 to tighten or remove the nuts.

The shanks 17 of the hooks 11 extend longitudinally along the body in a rearward direction from the attached ends thereof and are formed with U-shaped bends 18 adjacent the front attached ends thereof seated in recesses, as at 19, in the outer surface of the body to prevent turning or swinging movement of the hooks and to hold the bills 20 of the hooks 11 in a rearwardly projecting position relative to said body. Both the top and bottom of the body are provided with one or more of the hooks 11 with the bill 20 of the upper hook held upwardly and the bill 20 of the lower hook, or hooks, held downwardly.

The confronting faces of the body sections 5, 6, at their forward ends are formed with matching longitudinal grooves 21, 22 tightly receiving a sleeve 23 forming part of means for attaching to the front end of the body a spinner 28 and a line attaching stem 27 which need merely be identified, in passing, since the same form, per se, no part of this invention.

The body sections 5, 6 may be constructed of suitable material and colored or ornamented to suit the fancy of the individual whereby body sections of various color combinations may be interchangeably assembled and secured together by the hooks 11.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention, what is claimed as new is:

An artificial bait comprising a body including a pair of oblong flat faced sections opposed with flat faces confronting, at least one of said faces having transverse grooves therein inclining from the longitudinal center of the section toward one end of the section to the sides of said body, said section being provided with other transverse grooves in the face thereof inclining from said longitudinal center toward the other end of said body to the sides of said body, flexible lure elements positioned in said grooves to extend beyond opposite sides of said body at the same inclination as said grooves, and hooks having shanks extending along the outer sides of the body and provided with angular ends extending transversely into said body from one side thereof intermediate two of said grooves with nuts threaded thereon and countersunk in the opposite side of the body.

CARL F. WEIGANDT.

References Cited in the file of this patent

UNITED STATES PATENTS

| Number | Name | Date |
|---|---|---|
| 350,766 | Pattyson | Oct. 12, 1886 |
| 1,309,061 | Cassedy | July 8, 1919 |
| 1,611,635 | Dills | Dec. 21, 1926 |
| 2,121,474 | Bowering | June 21, 1938 |
| 2,224,389 | Haselwood | Dec. 10, 1940 |